(12) United States Patent
Keller et al.

(10) Patent No.: US 11,859,542 B2
(45) Date of Patent: Jan. 2, 2024

(54) DUAL POWER LIFT SYSTEM

(71) Applicant: Rolls-Royce North American Technologies, Inc., Indianapolis, IN (US)

(72) Inventors: Richard K Keller, Indianapolis, IN (US); Paul Johnson, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 17/645,162

(22) Filed: Dec. 20, 2021

(65) Prior Publication Data

US 2023/0296047 A1  Sep. 21, 2023

(51) Int. Cl.
*F02C 6/04* (2006.01)
*F02C 9/18* (2006.01)
*F02K 3/02* (2006.01)

(52) U.S. Cl.
CPC .................. *F02C 6/04* (2013.01); *F02C 9/18* (2013.01); *F02K 3/025* (2013.01);
(Continued)

(58) Field of Classification Search
CPC ............ B64C 29/0016; B64C 29/0025; B64D 2027/026; B64D 35/00; B64D 35/04;
(Continued)

(56) References Cited

U.S. PATENT DOCUMENTS 2,939,649 A * 6/1960 Shaw .................. B64C 29/0025
244/12.3
2,940,689 A * 6/1960 Howell ............... B64C 29/0025
244/12.3

(Continued)

FOREIGN PATENT DOCUMENTS

EP       3090951 A1   11/2016

OTHER PUBLICATIONS

Xiang et al., "Numerical Investigations of a Tip Turbine Aerodynamic Design in a Propulsion System for VTOL Vehicles", Published Aug. 3, 2019, 16 pgs.

(Continued)

*Primary Examiner* — Alain Chau
(74) *Attorney, Agent, or Firm* — Shumaker & Sieffert, P.A.

(57) ABSTRACT

A system including a turbine engine configured to generate rotor power and produce an engine air flow. The system is configured to provide rotor power to one of more shaft-driven lift fans to generate a first thrust on an aircraft body and provide a gas flow to one or more gas-driven lift fans to generate a second thrust on the aircraft body. The gas flow may be at least a portion of the engine air flow produced by the turbine engine. The turbine engine may be configured to exhaust another portion of the engine air flow through a jet nozzle to generate an engine thrust. In examples, the system includes at least a second turbine engine. The one of more shaft-driven lift fans and/or one of more gas-driven lift fans be powered by the turbine engine, the second turbine engine, or both the turbine engine and the second turbine engine.

20 Claims, 4 Drawing Sheets

(52) U.S. Cl.
CPC .... *F05D 2220/90* (2013.01); *F05D 2240/128* (2013.01); *F05D 2260/606* (2013.01); *F05D 2270/053* (2013.01); *F05D 2270/335* (2013.01)

(58) Field of Classification Search
CPC ...... F02C 6/04; F02C 6/06; F02C 6/08; F02C 6/062; F02C 6/065; F02K 3/00; F02K 3/02; F02K 3/025; F02K 3/04; F05D 2220/90; F05D 2220/328
See application file for complete search history.

(56) References Cited

U.S. PATENT DOCUMENTS

| | | | | |
|---|---|---|---|---|
| 3,087,691 | A * | 4/1963 | Sinclair | B64C 29/0025 60/39.15 |
| 3,100,611 | A * | 8/1963 | Madelung | B64C 29/0016 244/15 |
| 3,122,343 | A | 2/1964 | Leibach et al. | |
| 3,179,353 | A | 4/1965 | Peterson | |
| 3,215,369 | A | 11/1965 | Johnson | |
| 3,499,620 | A * | 3/1970 | Sturm | B64C 29/0033 244/12.4 |
| 3,674,224 | A | 7/1972 | Konecny et al. | |
| 3,678,690 | A * | 7/1972 | Shohet | F02K 3/06 60/226.3 |
| 3,739,580 | A * | 6/1973 | Bland | F02K 5/02 244/12.3 |
| 3,783,618 | A * | 1/1974 | Kawamura | F02K 3/068 244/23 B |
| 3,955,780 | A * | 5/1976 | Postelson | B64C 29/0016 244/12.3 |
| 3,972,490 | A * | 8/1976 | Zimmermann | B64C 29/0016 244/12.3 |
| 4,022,405 | A | 5/1977 | Peterson | |
| 5,209,428 | A * | 5/1993 | Bevilaqua | B64C 29/0025 244/12.3 |
| 5,246,188 | A * | 9/1993 | Koutsoupidis | B64C 29/0083 244/12.3 |
| 5,312,069 | A * | 5/1994 | Bollinger | F02K 3/068 244/12.3 |
| 6,269,627 | B1 * | 8/2001 | Freese | F02K 1/17 60/233 |
| 6,270,037 | B1 * | 8/2001 | Freese | B64C 29/0025 60/233 |
| 6,729,575 | B2 | 5/2004 | Bevilaqua | |
| 6,918,244 | B2 | 7/2005 | Dickau | |
| 7,267,300 | B2 * | 9/2007 | Heath | B64D 35/04 244/12.3 |
| 7,677,502 | B2 | 3/2010 | Lawson et al. | |
| 8,317,126 | B2 | 11/2012 | Harris et al. | |
| 8,382,030 | B2 * | 2/2013 | Kosheleff | B64C 29/0025 244/23 B |
| 8,562,284 | B2 | 10/2013 | Bradbrook | |
| 8,636,241 | B2 | 1/2014 | Lugg et al. | |
| 8,708,274 | B2 | 4/2014 | Lord | |
| 9,096,314 | B2 | 8/2015 | Brotherton-Ratcliffe et al. | |
| 9,624,870 | B2 | 4/2017 | Ress, Jr. et al. | |
| 9,676,479 | B2 * | 6/2017 | Brody | B64C 9/00 |
| 9,702,254 | B2 | 7/2017 | Saiz | |
| 9,776,714 | B2 | 10/2017 | Shapery | |
| 9,868,523 | B2 | 1/2018 | Hymer | |
| 10,427,784 | B2 | 10/2019 | Parks | |
| 10,710,713 | B2 | 7/2020 | Mia | |
| 10,926,874 | B2 | 2/2021 | Giannini et al. | |
| 2006/0192046 | A1 * | 8/2006 | Heath | B64D 35/04 244/12.3 |
| 2009/0121073 | A1 | 5/2009 | Doane et al. | |
| 2010/0301158 | A1 * | 12/2010 | Harris | B64C 15/14 244/12.5 |
| 2012/0056034 | A1 * | 3/2012 | Kosheleff | B64C 29/0025 244/58 |
| 2012/0294719 | A1 * | 11/2012 | Payne | B64C 29/0025 416/170 R |
| 2015/0274289 | A1 | 10/2015 | Newman et al. | |
| 2016/0214710 | A1 * | 7/2016 | Brody | B64C 29/0025 |
| 2020/0010185 | A1 | 1/2020 | Bender | |
| 2021/0078700 | A1 | 3/2021 | Klemen | |

OTHER PUBLICATIONS

Wikipedia—Ryan XV-5 Vertifan, Retrieved on Dec. 10, 2021 from from https://en.wikipedia.org/wiki/Ryan_XV-5_Vertifan, 5 pgs.

\* cited by examiner

DUAL POWER LIFT SYSTEM

TECHNICAL FIELD

The present disclosure relates to an lift fan system for an aircraft.

BACKGROUND

Some aircraft use lift/propulsion units for take-off, landing, hovering, and/or cruising with little or no forward movement. For example, the aircraft may be a VTOL (vertical take-off and landing), STOL (short take-off and landing) or STOVL (short take-off and vertical landing) aircraft. The lift/propulsion units may generate the vertical thrust in a variety of manners to support the vertical and/or short takeoffs and landings, such as steerable turbine nozzles to vector engine exhaust downward relative to the aircraft, driven lifts fans having vanes configured to force air downward relative to the aircraft, and other arrangements. Once in an airborne state, the aircraft may remain in a hovering or relatively slow cruise mode, and/or may generally vector the generated thrust aft until forward airspeed produces sufficient lift to support the aircraft.

SUMMARY

The present disclosure describes a system including a turbine engine configured to combust a fuel to generate shaft power and produce an engine air flow through the turbine engine. The system is configured to provide rotor power to one of more shaft-driven lift fans to generate a first thrust (e.g., a vertical thrust) on an aircraft body. The rotor power may be a portion of the shaft power. The system is configured to provide a gas flow from the turbine engine to one or more gas-driven lift fans to generate a second thrust on the aircraft body. A combination of the first thrust and the second thrust may enable the aircraft body to perform VTOL, STOL, or STOVL operations. The gas flow is at least a portion of the engine air flow produced by the turbine engine. The turbine engine may be configured to exhaust another portion of the engine air flow through a jet nozzle to generate an engine thrust on the aircraft body. In examples, the system include at least a second turbine engine configured to combust a fuel to generate another shaft power and produce an engine air flow through the second turbine engine. The one of more shaft-driven lift fans may receive the rotor power from the turbine engine, the second turbine engine, or both the turbine engine and the second turbine engine. The one of more gas-driven lift fans may receive the gas flow from the turbine engine, the second turbine engine, or both the turbine engine and the second turbine engine.

In examples, a system comprises: a turbine engine configured to combust a fuel to mechanically rotate a rotor to generate shaft power and generate an engine air flow through the turbine engine, wherein the turbine engine is configured to provide an engine thrust to an aircraft body using an exhaust flow, and wherein the exhaust flow is a portion of the engine air flow; a shaft-driven lift fan configured to rotate to provide a first thrust to the aircraft body using rotor power transferred from the rotor, wherein the rotor power is at least a portion of the shaft power; and a gas-driven lift fan configured to rotate to provide a second thrust to the aircraft body using a gas flow, wherein the gas flow is another portion of the engine air flow.

In examples, a system comprises: a first turbine engine configured to combust a first fuel to mechanically rotate a first rotor to generate a first shaft power and generate a first engine air flow through the first turbine engine, wherein the first turbine engine is configured to provide a first engine thrust to an aircraft body using a first exhaust flow, and wherein the first exhaust flow is a portion of the first engine air flow; a second turbine engine configured to combust a second fuel to mechanically rotate a second rotor to generate a second shaft power and generate a second engine air flow through the second turbine engine, wherein the second turbine engine is configured to provide a second engine thrust to the aircraft body using a second exhaust flow, and wherein the second exhaust flow is a portion of the second engine air flow; a shaft-driven lift fan configured to rotate to provide a first thrust to the aircraft body using at least one of a first rotor power transferred from the first rotor or a second rotor power transferred from the second rotor, wherein the first rotor power is a portion of the first shaft power and the second rotor power is a portion of the second shaft power; and a gas-driven lift fan configured to rotate to provide a second thrust to the aircraft body using at least one of a first gas flow or a second gas flow, wherein the first gas flow is another portion of the first engine air flow and the second gas flow is another portion of the second engine air flow.

In examples, a method comprises: combusting a fuel with a turbine engine to mechanically rotate a rotor to generate shaft power and generate an engine air flow through the turbine engine, wherein the turbine engine is configured to provide an engine thrust to an aircraft body using an exhaust flow, and wherein the exhaust flow is a portion of the engine air flow; generating a first thrust on the aircraft body using a shaft-driven lift fan configured to rotate using rotor power transferred from the rotor, wherein the rotor power is at least a portion of the shaft power; and generating a second thrust on the aircraft body using a gas-driven lift fan configured to rotate using a gas flow, wherein the gas flow is another portion of the engine air flow.

The details of one or more examples are set forth in the accompanying drawings and the description below. Other features, objects, and advantages will be apparent from the description and drawings, and from the claims.

DETAILED DESCRIPTION

Figure 1:
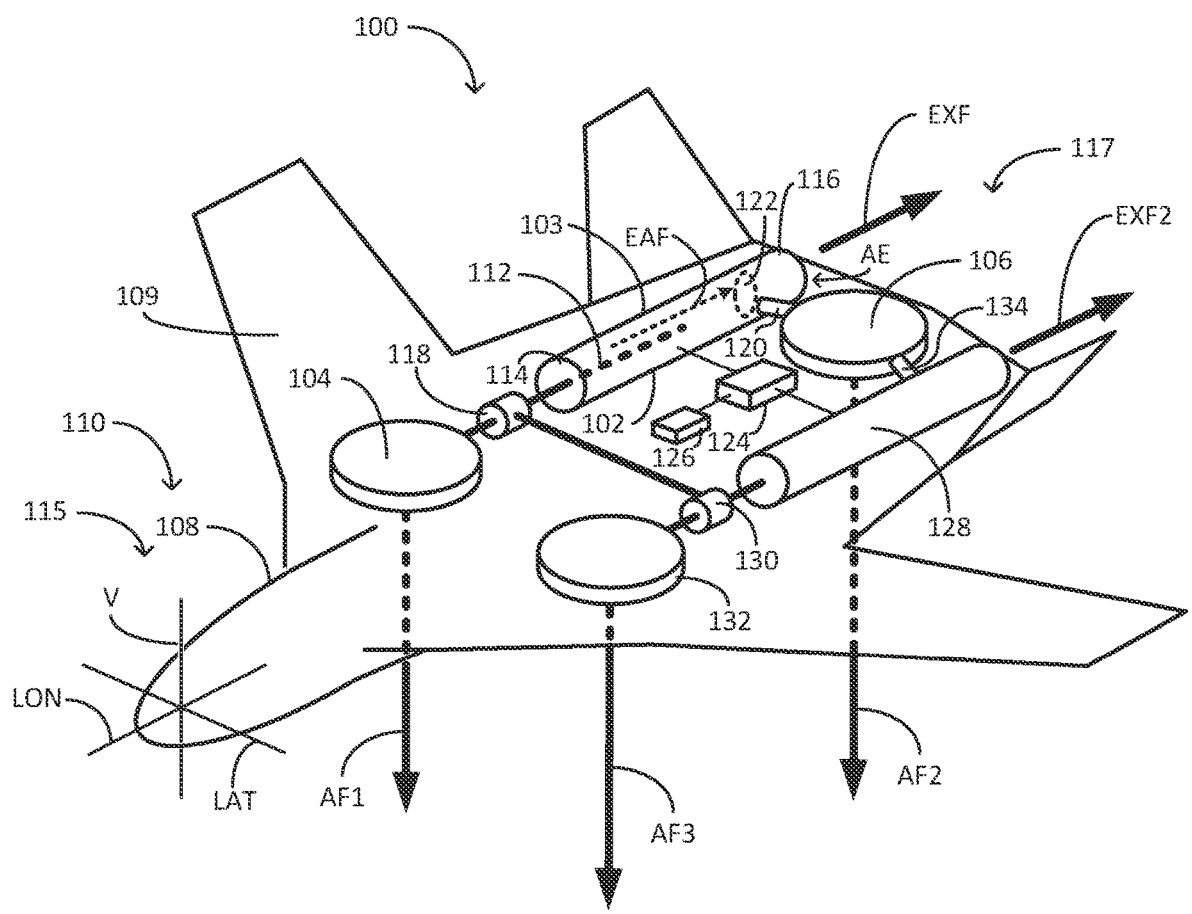
FIG. 1 is a perspective illustration of an example system configured to generate a thrust on a body of an aircraft.

The disclosure includes a system using a turbine engine to generate one or more thrusts (e.g., vertical and/or forward thrusts) on an aircraft body. The turbine engine is configured to combust a fuel to mechanically rotate a turbine rotor and generate an engine air flow through the turbine engine, as well as power other mechanical loads carried on the aircraft frame. The engine air flow or some portion thereof may be exhausted through a jet nozzle to generate an engine thrust on the aircraft body to, for example, provide forward airspeed to allow the aircraft wings to generate sufficient lift to support conventional airborne flight. The system may be configured to generate one or more additional thrusts (e.g., vertical thrusts) using one or more lift fans to act on the aircraft body simultaneously with or separately from the engine thrust.

The system includes a plurality of lift fans powered by the turbine engine. A lift fan may include a plurality of vanes configured to rotate to generate a directed air flow (e.g., in a downward direction), causing an oppositely oriented thrust (e.g., an upward and/or vertical thrust) on the aircraft body. The plurality of lift fans may include one or more shaft-driven lift fans powered by shaft power withdrawn from the rotor of the turbine engine, and may include one or more gas-driven lift fans powered by some portion of the air flow flowing through the turbine engine. The system may be configured to generate the thrusts on the aircraft body using only the one or more of the lift fans (e.g., in a vertical take-off or hover mode), using only the jet nozzle (e.g., in a conventional take-off or conventional flight mode), or using both one or more of the lift fans and the jet nozzle (e.g., in a short take-off or low speed cruise mode).

In examples, the turbine engine configured to combust a fuel to cause rotation of a turbine rotor to produce shaft power. The turbine engine may be configured to use some portion of the shaft power to generate an engine air flow (e.g., using the rotation of fan blades) through the turbine engine. In examples, the turbine engine is configured to selectively direct at least some portion of the engine airflow through a jet nozzle to cause engine thrust on the turbine engine and the aircraft body. The system is further configured to transfer power from the turbine engine to the shaft-driven lift fan and/or the gas-driven lift fan, such that the shaft-driven lift fan may provide a first thrust on the aircraft body and/or the gas-driven lift fan may provide a second thrust to the aircraft body. The system may be configured to cause the first thrust and/or the second thrust instead of or in addition to the engine thrust. In examples, the shaft-driven lift fan is configured to provide the first thrust as a vertical thrust acting on the aircraft body to at least partially counteract a gravity vector acting on the aircraft body. The gas-driven lift fan may be configured to provide the second thrust as a vertical thrust acting on the aircraft body to at least partially counteract the gravity vector acting on the aircraft body.

The one or more shaft-driven lift fans may be configured to generate the first thrust on the aircraft body using rotor power transferred from the turbine rotor, wherein the rotor power is a portion of the shaft power generated. In some examples, a shaft-driven lift fan may be configured to receive the rotor power from a gearbox configured to transmit the rotor power from the turbine engine to a shaft of the shaft-driven lift fan. In some examples, a shaft-driven lift fan is configured to receive electrical power from a generator driven by the rotor power. The one or more gas-driven lift fans may be configured to generate the second thrust using a gas flow, wherein the gas flow is a portion of the engine air flow. In examples, the gas-driven lift fan is configured to convert a flow energy (e.g., a kinetic energy, potential energy, and/or internal energy) of the gas flow into a rotary motion of a plurality of vanes. For example, the gas-driven lift fan may be a tip-turbine fan including one or more turbine blades configured to rotate the plurality of vanes when the gas flow impinges on the one or more turbine blades.

The system may provide advantage over aircraft lift fan systems which use only electrically powered fans receiving electrical power generated by one or more turbines and/or mechanically powered fans receiving mechanical power generated by one or more turbines. Such systems may suffer a decrease in efficiency by exhausting at least some portion of the energy generated by a turbine as a relatively high velocity exhaust flow with limited contribution to the production of vertical thrust on the aircraft. The gas-driven lift fan employed herein may more effectively employ the flow energy that might otherwise be expended as exhaust flow by utilizing the flow energy for the rotation of the gas-driven lift fan.

The system is configured such that the turbine engine may generate shaft power to provide the rotor power to drive the shaft-driven lift fan while generating engine air flow to provide the gas flow to drive the gas-driven lift fan, such that the turbine engine may concurrently use both shaft power and engine air flow to provide vertical thrust to the aircraft body. In examples, the system includes control circuitry configured to determine a first power requirement required by the shaft-driven lift fan to provide the first thrust. The control circuitry may be configured to determine a second power requirement required by the gas-driven lift fan to provide the second thrust. The control circuitry may be configured to control a throttle controlling the flow of fuel to the turbine engine based on at least the first power requirement and the second power requirement. In examples, the control circuitry is configured to determine the flow of fuel required for the turbine engine to satisfy at least the first power requirement and the second power requirement. For example, the control circuitry may be configured to determine the flow of fuel required based on the first power requirement, the second power requirement, a third power requirement required to provide an engine thrust, and additional power requirements required to power other operating loads (e.g., generators, pumps, gearboxes, boost compressors, an ECS, a control surface conditioning system, a fuel tank pressurization system, other service air systems, and other loads operating onboard the aircraft). Hence, the control circuitry may be configured to provide the fuel such that operations of the turbine engine sustainably support the shaft power withdrawn from the turbine engine (e.g., the first power requirement) and the flow energy supplied by the withdrawn gas flow (e.g., the second power requirement).

In examples, the control circuitry may be configured to determine at least the first power requirement and the second power requirement. The control circuitry may be configured to determine at least the first power requirement and the second power requirement based on a attitude of the aircraft body. The attitude may be, for example, an orientation of the aircraft body with respect to one or more reference axes (e.g., a gravity vector) having an orientation substantially independent from the attitude of the aircraft body. In some examples, the control circuitry is configured to receive a signal indicative of a current attitude and/or desired attitude from an attitude control system. The control circuitry may be configured to determine at least the first power requirement and the second power requirement based on the indicative signal from the attitude control system.

As used herein, a thrust on the aircraft body may mean a force acting on the aircraft body which tends to produce motion of the aircraft body through a spatial coordinate system and/or counteracts a gravity force acting on the aircraft body. In examples, a lift fan (e.g., a shaft-driven lift fan and/or a gas-driven lift fan) is configured to generate a flow of air such that the flow of air causes a reaction force (e.g., a first thrust or second thrust) on the lift fan. The lift fan may be configured to transmit the thrust to the aircraft body to produce motion of the aircraft body through a spatial coordinate system and/or counteract a gravity force acting on the aircraft body. In examples, the turbine engine is configured to generate a flow of air such that the flow of air causes a reaction force (e.g., an engine thrust) on the turbine engine. The turbine engine may be configured to transmit the engine thrust to the aircraft body to produce motion of the aircraft body through a spatial coordinate system and/or counteract a gravity force acting on the aircraft body. As used herein, an engine air flow may mean an air flow drawn into the turbine engine (e.g., by an intake fan) and passing through at least some portion of a housing (e.g., a pod and/or cowling) of the turbine engine.

FIG. 1 illustrates a perspective drawing of an example system 100 including a turbine engine 102 configured to provide power to a shaft-driven lift fan 104 and a gas-driven lift fan 106. Turbine engine 102, shaft-driven lift fan 104, and gas-driven lift fan 106 may be mechanically supported by an aircraft body 108 of an aircraft 110. FIG. 1 illustrates aircraft body 108 as a general profile for clarity and further illustrates principal axes of aircraft body 108, including a longitudinal axis LON, a lateral axis LAT orthogonal to the axis LON, and a vertical axis V orthogonal to the axes LON and LAT.

Turbine engine 102 is configured to combust a fuel to generate a shaft power (e.g., a rotary power) using turbine rotor 112 and generate an engine air flow EAF within turbine engine 102 (e.g., via intake section 114). Shaft-driven lift fan 104 is configured to generate a first thrust using rotor power generated by turbine engine 102, where the rotor power is a portion of the shaft power. Gas-driven lift fan 106 is configured to generate a second thrust using a gas flow provided by turbine engine 102, wherein the gas flow is a portion of engine air flow EAF. Turbine engine 102 may be configured to provide an engine thrust using an exhaust air flow EXF (e.g., via a jet nozzle 116), wherein exhaust air flow EXF is another portion of engine air flow EAF. In examples, turbine engine 102 is configured to cause exhaust air flow EXF to exit jet nozzle 116 through an outlet area AE defined by a boundary of jet nozzle 116. In examples, turbine engine 102 is configured to vary the outlet area AE by adjusting a configuration of jet nozzle 116. Turbine engine 102 may be configured to vary the outlet area AE to, for example, vary the engine thrust provided by turbine engine 102, vary a pressure of engine air flow EAF within turbine engine 102, or for other reasons. In examples, aircraft body 108 mechanically supports turbine engine 102 such that a housing 103 of turbine engine 102 is substantially stationary relative to the axes LON, LAT and V.

Shaft-driven lift fan 104 and/or gas-driven lift fan 106 may be located anywhere on aircraft body 108. One or more gas-driven fans (e.g., gas-driven fan 106) may be located relative to one or more shaft-driven fans (e.g., shaft-driven fan 104) in any direction on aircraft body 108. In some examples, one or more gas-driven fans (e.g., gas-driven fan 106) may be located substantially aft of one or more shaft-driven fans (e.g., shaft-driven fan 104) on aircraft body 108 (e.g., displaced in an aft direction from one or more shaft-driven fans). For example, gas-driven fan 106 may be located aft of shaft-driven fan 104 to provide a more direct flow path for a gas flow provided to gas-driven fan 106 from turbine engine 102. As used here, an aft direction may mean a direction from a front portion 115 of aircraft body 108 toward a rear section of aircraft body 108. A forward direction may mean a direction from rear portion 117 of aircraft body 108 toward front section 115 of aircraft body 108.

Shaft-driven lift fan 104 may be configured to generate the first thrust, gas-driven lift fan 106 may be configured to generate the second thrust, and turbine engine 102 may be configured to generate the engine thrust to act on aircraft body 108 in any direction relative to the axis LON, the axis LAT, and the axis V. In examples, shaft-driven lift fan 104 is configured such that at least a component of the first thrust generated acts on aircraft body 108 in a direction substantially parallel to the axis V (e.g., to counteract a gravity vector acting on aircraft body 108). Gas-driven lift fan 106 may be configured such that at least a component of the second thrust generated acts on aircraft body 108 in a direction substantially parallel to the axis V (e.g., to counteract a gravity vector acting on aircraft body 108). Turbine engine 102 may be configured such that at least a component of the engine thrust generated acts on aircraft body 108 in a direction substantially parallel to the axis LON. Aircraft body 108 includes one or more wings such as wing 109 configured to generate lift on aircraft body 108 when turbine engine 102, shaft-driven lift fan 104, and/or gas-driven lift fan 106 provide thrust substantially parallel to the axis LON (e.g., in a forward direction of aircraft body 108).

In examples, shaft-driven lift fan 104 is configured to produce a first air flow AF1 using the rotor power provided by turbine engine 102. Shaft-driven lift fan 104 may be configured such that air flow AF1 causes a reaction force (e.g., the first thrust) on shaft-driven lift fan 104 when shaft-driven lift fan 104 produces air flow AF1. Shaft-driven lift fan 104 may be configured to transmit at least some portion of the first thrust to aircraft body 108. In examples, shaft-driven lift fan 104 is configured to produce air flow AF1 is a direction substantially away from aircraft body 108 to provide the first thrust acting toward aircraft body 108. Shaft-driven lift fan 104 may be configured (e.g., steerable by a control system and/or an operator) to produce air flow AF1 in any direction relative to the axes LAT, LON, and/or V. In examples, shaft-driven lift fan 104 is configured to produce air flow AF1 such that at least some portion of air flow AF1 flows in a direction substantially parallel to the axis V (e.g., in a downward direction relative to aircraft body 108), such that shaft-driven lift fan 104 provides the first thrust acting in a substantially opposite direction on aircraft body 108 (e.g., in an upward direction relative to aircraft body 108).

In examples, gas-driven lift fan 106 is configured to produce a second air flow AF2 using the gas flow provided by turbine engine 102. Shaft-driven lift fan 104 may be configured such that air flow AF2 causes a reaction force (e.g., the second thrust) on gas-driven lift fan 106 when gas-driven lift fan 106 produces air flow AF2. Gas-driven lift fan 106 may be configured to transmit at least some portion of the second thrust to aircraft body 108. Gas-driven lift fan 106 may be configured (e.g., steerable by a control system and/or an operator) to produce air flow AF2 in any direction relative to the axes LAT, LON, and/or V. In examples, gas-driven lift fan 106 is configured to produce air flow AF2 is a direction substantially away from aircraft body 108 to provide the second thrust acting toward aircraft body 108. In examples, gas-driven lift fan 106 is configured to produce air flow AF2 such that at least some portion of air flow AF2 flows in a direction substantially parallel to the axis V (e.g., in a downward direction relative to aircraft body 108), such that gas-driven lift fan 106 provides the second thrust acting in a substantially opposite direction on aircraft body 108

(e.g., in an upward direction relative to aircraft body 108). Gas-driven lift fan 106 may be configured to be steered independently of and/or in a different direction from shaft-driven lift fan 104, and vice-versa, such that, for example, shaft-driven lift fan 104 may generate the air flow AF1 in a first direction and gas-driven lift fan 106 may generate the air flow AF2 in a second direction different from the first direction.

Turbine engine 102 may be configured may be configured such that exhaust air flow EXF causes a reaction force (e.g., the engine thrust) on turbine engine 102 when turbine engine 102 produces exhaust air flow EXF. Turbine engine 102 may be configured to transmit at least some portion of the engine thrust to aircraft body 108. Turbine engine 102 may be configured to produce exhaust air flow EXF is a direction substantially away from aircraft body 108 to provide the engine thrust acting toward aircraft body 108. Turbine engine 102 may be configured (e.g., have a component such as jet nozzle 116 steerable by a control system and/or an operator) to produce exhaust air flow EXF in any direction relative to the axes LAT, LON, and/or V. In examples, turbine engine 102 is configured to produce exhaust air flow EXG such that at least some portion of exhaust air flow EXF flows in a direction substantially parallel to the axes LON (e.g., in an aft direction relative to aircraft body 108), such that turbine engine 102 provides the engine thrust acting in a substantially opposite direction on aircraft body 108 (e.g., in a forward direction relative to aircraft body 108). Turbine engine 102 (e.g., jet nozzle 116) may be configured to be steered independently of and/or in a different direction from shaft-driven lift fan 104 and/or gas-driven lift fan 106, and vice-versa, such that, for example, turbine engine 102 may generate exhaust air flow EXF in a third direction different from the first direction of air flow AF1 produced by shaft-driven lift fan 104 and different from the second direction of air flow AF2 produced by gas-driven lift fan 106.

In examples, shaft-driven lift fan 104 may be configured to receive the rotor power transferred from turbine engine 102 via a transmission system 118 operably coupled to turbine engine 102 (e.g., turbine rotor 112). The gearbox of transmission system 118 may be configured to receive the rotor power produced by turbine engine 102 as an input torque and provide at least some portion of the rotor power to shaft-driven lift fan 104 as an output torque, such that shaft-driven lift fan 104 may provide the first thrust using the rotor power. In some examples, transmission system 118 includes a generator (e.g., an AC generator or DC generator) configured to receive the rotor power from turbine engine 102 and generate electrical power. For example, the generator may include a generator rotor configured to rotate using the rotor power to generate the electrical power. Transmission system 118 may be configured to provide some portion of the electrical power to a motor of shaft-driven lift fan 104, such that shaft-driven lift fan 104 may provide the first thrust using the rotor power. In examples, system 100 is configured to control transmission system 118 to substantially control and/or determine a magnitude of the first thrust produced by shaft-driven lift fan 104. For example, system 100 may be configured to control the input torque provided to a gearbox of transmission system 118 (e.g., using a clutch and/or another component). System 100 may be configured to control the electrical power generated by a generator of transmission system 118 (by controlling a field of the generator, a rotation of the generator rotor, or some other parameter of the generator).

Turbine engine 102 may be configured to provide the gas flow to gas-driven lift fan 106 via a duct 120. Duct 120 may be configured to fluidically couple turbine engine 102 and gas-driven lift fan 106, such that turbine engine 102 may provide some portion of engine air flow EAF (e.g., the gas flow) to gas-driven lift fan 106. In examples, turbine engine 102 is configured to divert at least a portion of engine air flow EAF to duct 120 to provide the gas flow. For example, turbine engine 102 may include a diverter valve 122 configured to divert the portion of engine air flow EAF, such that the portion of engine air flow EAF flows into duct 120 rather than exhausting through jet nozzle 116 as exhaust air flow EXF. System 100 may be configured to substantially control and/or determine a magnitude of the second thrust produced by gas-driven lift fan 106 and a magnitude of the engine thrust produced by turbine engine 102 (e.g., using diverter valve 122). For example, system 100 may control diverter valve 122 such that the second thrust produced by gas-driven lift fan 106 is greater than the engine thrust provided by turbine engine 102 (e.g., when aircraft 110 is in a slow speed cruise mode or hover mode). System 100 may control diverter valve 122 such that the second thrust produced by gas-driven lift fan 106 is less than the engine thrust provided by turbine engine 102 (e.g., when aircraft 110 is in a faster speed cruise mode or normal flight mode). System 100 may control diverter valve 122 such that gas-driven lift fan 106 produces the second thrust while turbine engine 102 produces substantially no engine thrust, and/or control diverter valve 122 such that turbine engine 102 produces the engine thrust while gas-driven lift fan 106 produces substantially no second thrust.

In examples, system 100 includes control circuitry 124 configured to determine one or more of a first power requirement required by shaft-driven lift fan 104 to provide the first thrust, a second power requirement required by gas-driven lift fan 106 to provide the second thrust, and/or a third power requirement required by turbine engine 102 to provide the engine thrust. Control circuitry 124 may be configured to control the operation of turbine engine 102 based on the first power requirement, the second power requirement, or the third power requirement. For example, control circuitry 124 may be configured to control one or more of a throttle controlling the flow of fuel to turbine engine 102, transmission system 118, diverter valve 122, and/or other components of system 100 which may impact the first thrust, second thrust, and/or engine thrust produced. Control circuitry 124 may be configured to control the throttle, transmission system 118, diverter valve 122, and/or the other components such that turbine engine 102 operates in a manner to substantially satisfy at least the first power requirement, the second power requirement, and/or the third power requirement. Control circuitry 124 may be configured to control the throttle, transmission system 118, diverter valve 122, and/or the other components such that turbine engine 102 operates in a manner to substantially satisfy additional power requirements required by other operating loads in addition to the first power requirement, the second power requirement, and/or the third power requirement, such as additional generators, pumps, additional gearboxes, boost compressors, an ECS, control surface conditioning systems, fuel tank pressurization systems, other service air systems, and other loads operating onboard the aircraft. Hence, control circuitry 124 may be configured to control the operation of turbine engine 102 such that turbine engine 102 sustainably supports the shaft power withdrawn from rotor 112 and the flow energy provided by engine air flow EAF to gas-driven lift fan 106 and/or jet nozzle 116.

Control circuitry 124 may be configured to determine at least the first power requirement, the second power requirement, and/or the third power requirement based on an attitude of aircraft body 108. For example, system 100 may include attitude control circuitry 126 configured to determine an attitude of aircraft body 108 (e.g., an orientation of the axes LON, LAT, and/or V) with respect to one or more reference axes (e.g., a gravity vector) having an orientation substantially independent from the attitude of aircraft body 108. In some examples, control circuitry 124 is configured to receive a signal indicative of a current attitude and/or desired attitude from attitude control circuitry 126 and determine at least the first power requirement, the second power requirement, and/or the third power requirement based at least in part on the indicative signal from attitude control circuitry 126. In examples, control circuitry 124 is configured to determine at least the first power requirement, the second power requirement, and/or the third power requirement necessary to substantially achieve and/or substantially maintain an attitude of aircraft body 108. For example, control circuitry 124 may be configured to determine at least the first power requirement, the second power requirement, and/or the third power requirement necessary to substantially achieve and/or and substantially maintain an specific orientation of the axes LON, LAT, and/or V with respect to the one or more reference axes. Control circuitry 124 may be configured to control the throttle, transmission system 118, diverter valve 122, and/or other components of aircraft 110 such that turbine engine 102 operates in a manner to substantially satisfy at least the first power requirement, the second power requirement, and/or the third power requirement necessary to substantially achieve and/or substantially maintain the specific orientation of the axes LON, LAT, and/or V with respect to the one or more reference axes.

System 100 may include any number of turbine engines, any number of shaft-driven lift fans, and any number of gas-driven lift fans. In examples, system 100 includes at least a second turbine engine 128. System 100 may include at least a second transmission system 130, a second shaft-driven lift fan 132, and a second duct 134. Second turbine engine 128, second transmission system 130, second shaft-driven lift fan 132, and second duct 134 may be configured similarly and in relation to each other in the same manner as turbine engine 102, transmission system 118, shaft-driven lift fan 104, and duct 120. Second turbine engine 128 may provide a second gas flow via second duct 134 to gas-driven lift fan 106 and/or to other gas-driven lift which may be present in system 100. Second shaft-driven lift fan 132 may be configured to produce a third air flow AF3 using rotor power provided by second turbine engine 128 in substantially the same manner as that employed by shaft-driven lift fan 104 for the production of first air flow AF1 using the rotor power provided by turbine engine 102.

Shaft-driven lift fan 104 may be configured such that air flow AF1 causes a reaction force (e.g., the first thrust) on shaft-driven lift fan 104 when shaft-driven lift fan 104 produces air flow AF1. Second turbine engine 228 may be configured to provide an engine thrust using a second exhaust air flow EXF2 in substantially the same manner as that employed by turbine engine 102 for the production of exhaust air flow EXF. Second shaft-driven lift fan 132 may be configured to transmit at least some portion of a reaction force on second shaft-driven lift fan 132 caused by air flow AF3 to aircraft body 108 to produce a third thrust on aircraft body 108. Second turbine engine 128 may be configured to transmit at least some portion of a reaction force on second turbine engine 128 caused by second exhaust air flow EXF2 to aircraft body 108 to produce a second engine thrust on aircraft body 108. Control circuitry 124 may be configured to determine a power requirement required by second shaft-driven lift fan 132 to provide the third thrust, a power requirement required by gas-driven lift fan 106 to provide the second thrust, and/or a power requirement required by second turbine engine 128 to provide the second engine thrust. As will be discussed, control circuitry may be configured to control the operation of turbine engine 102 and/or second turbine engine 128 such that turbine engine 102 and/or second turbine engine 128 sustainably support the energy requirements of at least shaft-driven lift fan 104 for production of a first thrust, gas-driven lift fan 106 for production of a second thrust, second shaft-driven lift fan 132 from production of a third thrust, turbine engine 102 for production of an engine thrust, and/or second turbine engine 128 for production of a second engine thrust.

Figure 2:
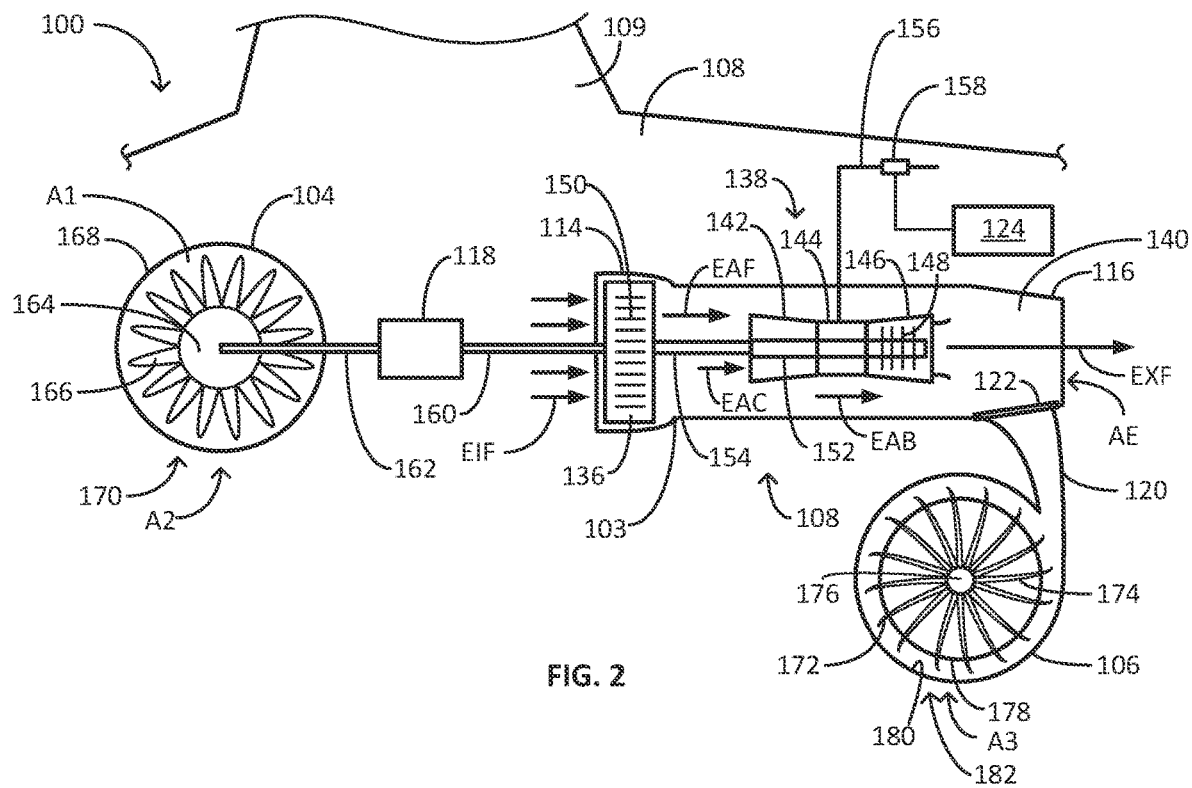
FIG. 2 is a schematic illustration of an example turbine engine including a shaft-driven lift fan and a gas-driven lift fan.
Figure 3:
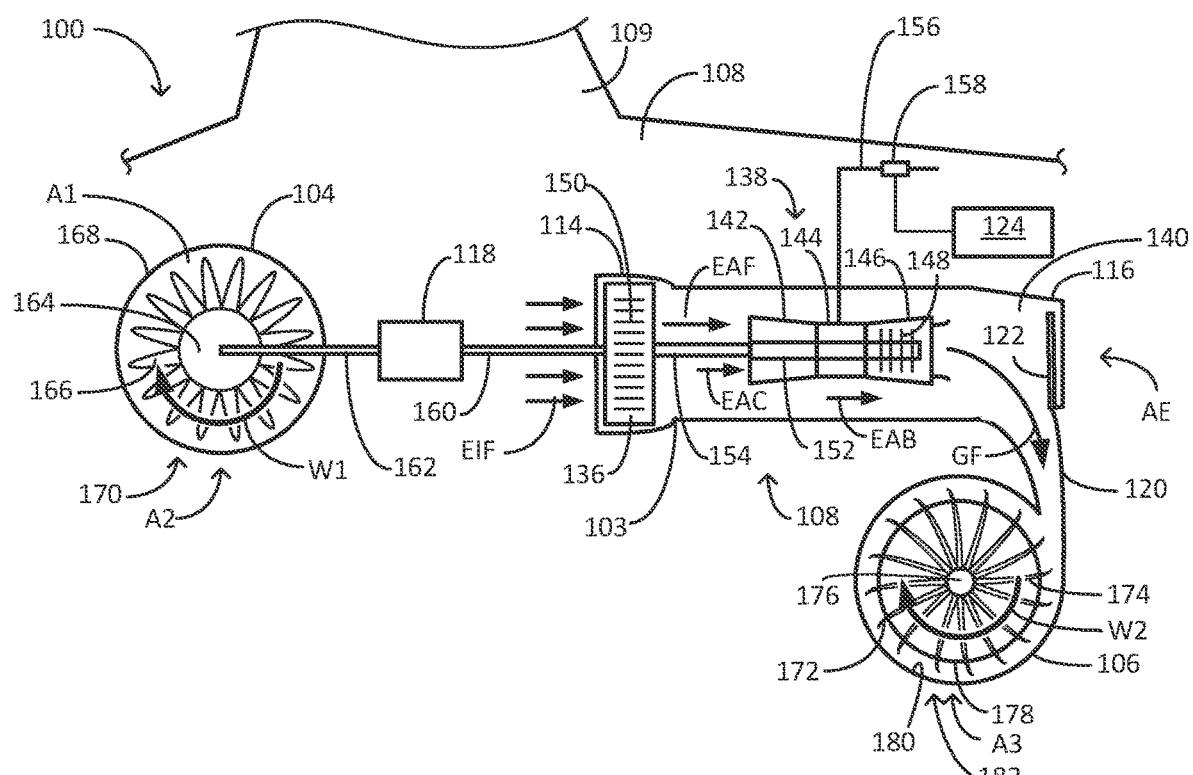
FIG. 3 is a is a schematic illustration of an example turbine engine causing rotation of the shaft-driven lift fan and the gas-driven lift fan.

FIG. 2 is a schematic illustration of system 100 in a first configuration with turbine engine 102 providing a thrust on aircraft body 108 (e.g., providing a forward thrust to support the generation of lift by wing 109). FIG. 3 is a schematic illustration of system 100 in a second configuration with shaft-driven lift fan 104 provided a first thrust on aircraft body 108 and gas-driven lift fan providing a second thrust on aircraft body 108.

Turbine engine 102 is configured to combust a fuel to generate shaft power using turbine rotor 112 and generate engine air flow EAF within turbine engine 102 via intake section 114. Turbine engine 102 may include an intake fan 136, an engine core 138, an exhaust section 140, and jet nozzle 116. Engine core 138 is configured to combust the fuel to produce a rotation of turbine rotor 112. Engine core 138 may include one or more of a compressor 142, a combustor 144, and a turbine 146 including a plurality of turbine blades 148 coupled to turbine rotor 112. Intake fan 136 may be coupled to turbine rotor 112 and configured to generate an intake air flow EIF using intake fan 136 (e.g., through the rotation of fan blades 150) through turbine engine 102. Engine air flow EAF may be some portion of or substantially all of the intake air flow EIF. In examples, intake fan 136 is a variable pitch fan configured to vary the pitch (e.g., blade angle) of fan blades 150 to, for example, very a pressure ratio between intake air flow EIF and engine air flow EAF.

In examples, turbine engine 102 is configured to direct some portion of engine air flow EAF to engine core 138 as a core airflow EAC and direct another portion of engine air flow EAF to bypass engine core 138 as a bypass airflow EAB. Turbine engine 102 may be configured to direct at least some portion of engine airflow EAF (e.g., a portion of bypass airflow EAB) through jet nozzle 116 as exhaust flow EXF to cause an engine thrust on turbine engine 102 and aircraft body 108. Turbine engine 102 may also be configured such that combustion gases produced by the combustion of fuel within engine core 138 are directed through jet nozzle 116. Turbine rotor 112 may be one or more rotors configured to provide some portion of the shaft power (e.g., a torque) generated by turbine engine 102. For example, turbine rotor 112 may include at least a first rotor 152 (e.g., an HP shaft) configured to provide a first portion of the shaft power to a first load (e.g., compressor 142) and a second rotor 154 (e.g., an LP shaft) configured to provide a second portion of the shaft power to a second load (e.g., intake fan 136). Turbine rotor 112 may be configured to vary a speed of and/or power of second rotor 154 relative to a speed of and/or power of first rotor 152, such that, for example, a speed and/or power supplied to intake fan 136 may be varied substantially independently of a speed and/or power supplied to compressor 142. In examples, first rotor 152 and second rotor 154 are concentric rotors configured to rotate around a common rotational axis.

Within engine core 138, compressor 142 may be configured to pressurize core airflow EAC and provide the pressurized air to combustor 144. Turbine engine 102 may include a fuel line 156 configured to provide a flow of fuel to combustor 144 and a throttle 158 to control the flow of fuel. Combustor 144 may be configured to combust the fuel supplied via fuel line 156 using the pressurized air flow from compressor 142. Turbine engine 102 may be configured to direct the resulting combustion gases to turbine 146.

Turbine engine 102 may be configured such that the directed combustion gases act on turbine blades 148 to cause rotation of turbine rotor 112 and generate shaft power (e.g., a torque on turbine rotor 112). Turbine engine 102 may be configured to provide some portion of the shaft power to drive intake fan 136, compressor 142, and/or other loads, such as generators, pumps, gearboxes, boost compressors, and the like. In some examples, turbine engine 102 is configured to provide portions of engine air flow EAF to other systems, such as an environmental control system (ECS), a de-icing or other control surface conditioning system, a fuel tank pressurization system, other service air systems, and other systems onboard the aircraft. In this manner, turbine engine 102 may combust a fuel to generate engine air flow EAF and shaft power to support operations of aircraft 110.

Turbine engine 102 is configured to transfer at least some portion of the shaft power produced using turbine rotor 112 to transmission system 118, such that transmission system 118 may provide at least a portion of the rotor power to shaft-driven lift fan 104 (e.g., in the form of mechanical power or electrical power. As discussed, transmission system 118 may provide the rotor power withdrawn from turbine engine 102 as mechanical power (e.g., using a gearbox) or as electrical power (e.g., using a generator). In some examples, A gearbox of transmission system 118 is configured to receive the rotor power as an input torque on an input shaft 160 and transfer at least some portion of the input torque to a transfer element 162. Transfer element 162 may be, for example, an output shaft. The gearbox of transmission system 118 may be configured to provide at least some portion of the rotor power to shaft-driven lift fan 104 as an output torque via power transfer element 162 (e.g., an output shaft), such that shaft-driven lift fan 104 may provide the first thrust using the rotor power. The gearbox may include, for example, a gear train, a clutch, and/or other components configured to transfer some portion of an input torque to produce an output torque (e.g., to provide a load path from input shaft 160 to the output shaft). In examples, the gearbox of transmission system 118 is configured to vary a rotational speed of the output shaft for a given rotational speed of input shaft 160. For example, the gearbox may be configured to vary the rotational speed of the output shaft through the selection of different load paths through a clutch mechanism, selection of individual gear paths providing separate overall gear ratios, and/or using other components configured to vary a rotational speed of the output shaft for a given rotational speed of input shaft 160.

In some examples, transmission system 118 includes a generator (e.g., an AC generator or DC generator) configured to receive the rotor power from turbine engine 102 (e.g., via input shaft 160) and generate electrical power. For example, the generator may include a generator rotor configured to rotate using the rotor power to generate the electrical power. Transfer element 162 may be, for example, an electrical bus configured to receive the electrical power from the generator. Transmission system 118 may be configured to provide some portion of the electrical power to a motor of shaft-driven lift fan 104, such that shaft-driven lift fan 104 may provide the first thrust using the rotor power. Transmission system 118 may include, for example, additional electrical buses, switches, electrical breakers, analog and/or digital converters, and other components configured to transfer electrical power from the generator to shaft-driven lift fan 104.

System 100 may be configured to control turbine engine 102, transmission system 118, and/or other components of system 100 to substantially control and/or determine a magnitude of the first thrust produced by shaft-driven lift fan 104. System 100 may be configured to control turbine engine 102, transmission system 118, and/or other components of system 100 to substantially control and/or determine the shaft power withdrawn from turbine engine 102 to provide rotor power for use by shaft-driven lift fan 104. For example, system 100 may be configured to control an input torque provided to a gearbox of transmission system 118 (e.g., using a clutch and/or another component). System 100 may be configured to control the electrical power generated by a generator of transmission system 118 (by controlling a field of the generator, a rotation of the generator rotor, or some other parameter of the generator).

Shaft-driven lift fan 104 is configured to generate air flow AF1 (FIG. 1) to provide a first vertical thrust on aircraft body 108 using rotor power transferred from turbine rotor 112 via transmission system 118. As discussed, transmission system 118 may transfer the rotor power transferred from turbine rotor 112 to shaft-driven lift fan 104 as mechanical power (e.g., a torque) or as electrical power. Shaft-driven lift fan 104 may be configured to cause a rotation of a shaft-driven fan shaft 164 when shaft-driven lift fan 104 receives the rotor power transferred via transfer element 162 from transmission system 118. Shaft-driven fan shaft 164 may be configured to transfer a rotary torque to a plurality of vanes 166 to cause shaft-driven lift fan 104 to generate air flow AF1. In examples, shaft-driven lift fan 104 includes one or more shaft-driven fan shafts including shaft-driven fan shaft 164. Shaft-driven lift fan 104 may include one or more pluralities of vanes including plurality of vanes 166, with a plurality of vanes configured to receive a rotary torque from at least one of the one or more shaft-driven fan shafts. In some examples, shaft-driven lift fan 104 is a multi-stage fan (e.g., a two stage fan). In some examples, shaft-driven lift fan 104 is a counter-rotating fan, such that shaft-driven lift fan 104 produces air flow AF1 by rotating a first plurality of vanes in a first rotational direction around a rotational axis and rotating a second plurality of vanes in a second rotational direction around the rotational axis, with the second rotational direction substantially opposite the first rotational direction. Shaft-driven lift fan 104 may be a variable pitch fan configured to vary the pitch (e.g., blade angle) of one or more of the plurality of vanes 166 to vary a pressure ratio across one or more stages of shaft-driven lift fan 104 to, for example, vary the first thrust provided by shaft-driven lift fan 104, vary a pressure of engine air flow EAF within turbine engine 102, or for other reasons.

In some examples, shaft-driven lift fan 104 is configured to generate air flow AF1 through a flow path defined by a shaft-driven fan inlet 168 and a shaft-driven fan outlet 170. Shaft-driven lift fan 104 may be configured to rotate vanes 164 to cause air flow AF1 to enter shaft-driven lift fan 104 through an inlet area A1 defined by a boundary of shaft-driven fan inlet 168 and exit shaft-driven lift fan 104 through an outlet area A2 defined by a boundary of shaft-driven fan outlet 170. In examples, shaft-driven lift fan 104 is configured to vary the inlet area A1 by adjusting and/or altering a configuration of shaft-driven fan inlet 168, and/or vary the outlet area A2 by adjusting and/or varying a configuration of shaft-driven fan outlet 170. Shaft-driven lift fan 104 may be configured to vary the inlet area A1 and/or the outlet area A2 to, for example, vary the first thrust provided by shaft-driven lift fan 104, vary a pressure of engine air flow EAF within turbine engine 102, or for other reasons.

FIG. 3 illustrates shaft-driven lift fan 104 receiving rotor power via transmission system 118 to cause a rotation W1 of vanes 166 around shaft-driven fan shaft 164. The rotation W1 causes shaft-driven lift fan 104 to generate air flow AF1 (FIG. 1) and provide the first thrust to aircraft body 108. FIG. 3 further illustrates turbine engine 102 providing a gas flow GF to gas-driven lift fan 106 to cause a rotation W2 to generate air flow AF2 (FIG. 1) and provide the second thrust to aircraft body 108. In the example of FIG. 3, turbine engine 102 is configured to limit or substantially block exhaust flow EXF from exhausting through jet nozzle 116, such that turbine engine 102 limits or substantially prevents production of an engine thrust on turbine engine 102. However, this is not required. As discussed, system 100 may be configured to provide the second thrust of gas-driven lift fan 106 concurrently with the engine thrust of turbine engine 102.

Gas-driven lift fan 106 is configured to generate air flow AF2 (FIG. 1) to provide a second vertical thrust on aircraft body 108 using flow energy (e.g., a kinetic energy, potential energy, and/or internal energy) transferred by gas flow GF. Turbine engine 102 is configured to provide gas flow GF to gas-driven lift fan 106 via duct 120. Duct 120 may be configured to fluidically couple turbine engine 102 and gas-driven lift fan 106, such that turbine engine 102 may provide some portion of engine air flow EAF (e.g., the gas flow) to gas-driven lift fan 106. Gas-driven lift fan 106 is configured to receive gas flow GF from duct 120 and cause the rotation W2 using gas flow GF.

In examples, gas-driven lift fan 106 is a tip turbine fan including a plurality of tip turbine blades 172 configured to generate a rotational torque when gas flow GF impinges on one or more of tip turbine blades 172. Tip turbine blades 172 may be configured to impart at least some portion of the rotational torque to a plurality of gas-driven vanes 174. Gas-driven vanes 174 may be configured to rotate (e.g., rotate about a gas-driven fan shaft 176) when the rotational torque is imparted by tip turbine blades 172. Gas-driven lift fan 106 may be configured such that the rotation of gas-driven vanes 174 causes gas-driven lift fan 106 to generate air flow AF2, causing the second thrust on aircraft body 108. In examples, gas-driven lift fan 106 may be a variable pitch fan configured to vary a pitch (e.g., blade angle) of one or more tip turbine blades 172 and/or gas-driven vanes 174 to vary a pressure ratio across gas-driven lift fan 106 to, for example, vary the second thrust provided by gas-driven lift fan 106, vary a pressure of engine air flow EAF within turbine engine 102, or for other reasons.

Gas-driven lift fan 106 may be configured to provide a first flow path for gas flow GF through gas-driven lift fan 106 and a second flow path for the generated air flow AF2 through gas-driven lift fan 106. Gas-driven lift fan 106 may be configured to substantially separate the first flow path and the second flow path, to, for example, limit mixing of gas flow GF and air flow AF2 within gas-driven lift fan 106. In examples, gas-driven lift fan includes at least one separation structure 178 configured to substantially separate the first flow path and the second flow path. Separation structure 178 may be, for example, a blade shroud, blade shoulder, or other structure configured to separate the first flow path and the second flow path. In examples, gas-driven lift fan 106 defines an inner surface 180 substantially surrounding tip turbine blades 172, and gas-driven lift fan 106 defines the first flow path for the gas flow GF substantially between separation structure 178 and inner surface 180. In examples, gas-driven lift fan 106 defines the second flow path for the air flow AF2 substantially between separation structure 178 and gas-driven fan shaft 176. In some examples, separation structure 178 is configured to transmit the rotational torque generated by tip turbine blades 172 (e.g., generated by the impingement of gas flow GF) to the plurality of gas-driven vanes 174.

In examples, gas-driven lift fan 106 includes a gas-driven fan outlet 182 configured to define at a portion of the first flow path and/or the second flow path. Gas-driven lift fan 106 may be configured to substantially exhaust air flow AF2 and/or gas flow GF through gas driven fan outlet 182 to generate the second thrust on aircraft body 108. In examples, gas-driven lift fan 106 is configured to cause air flow AF2 and/or gas flow GF to exit gas-driven lift fan 106 through an outlet area A3 defined by a boundary of gas-driven fan outlet 182. In examples, gas-driven lift fan 106 is configured to vary the inlet area A3 by vary the outlet area A3 by adjusting a configuration of gas-driven fan outlet 182. Gas-driven lift fan 106 may be configured to vary the outlet area A2 to, for example, vary the second thrust provided by gas-driven lift fan 106, vary a pressure of engine air flow EAF within turbine engine 102, or for other reasons.

Turbine engine 102 may be configured to divert at least a portion of engine air flow EAF to duct 120 to provide gas flow GF to gas-driven lift fan 106 using diverter valve 122. Divertor valve 122 may be configured to divert the portion of engine air flow EAF, such that the portion of engine air flow EAF flows into duct 120 rather than exhausting through jet nozzle 116 as exhaust air flow EXF. Divertor valve 122 may be configured to divert any portion (e.g., any percentage of) of engine air flow EAF to duct 120 to produce gas flow GF. For example, diverter valve 122 may be configured to divert a first percentage of engine air flow EAF to duct 120 in a first position, divert a second percentage of engine air flow EAF different from the first percentage in a second position, divert a third percentage of engine air flow EAF different from the first percentage and the second percentage in a third position, and so on. Hence, turbine engine 102 may be configured to control a magnitude of the engine thrust (produced using exhaust flow EXF) relative to a magnitude of the second thrust (produced using gas flow GF) based at least in part on a position of diverter valve 122.

Turbine engine 102 may be configured to divert the portion of engine air flow EAF at any location within turbine engine 102. For example, as illustrated in FIG. 2 and FIG. 3, turbine engine 102 may be configured to divert the portion of engine air flow EAF generally from exhaust section 140 of turbine engine 102. In other examples, turbine engine 102 may be configured to divert the portion of engine air flow EAF generally from a portion of turbine engine 102 upstream of exhaust section 140, such as a portion upstream or downstream from a portion of engine core 138. Further, although duct 120 is illustrated in FIG. 2 and FIG. 3 as a single branch having a single duct inlet for discussion, duct 120 may include a plurality of ducts and duct inlets configured to direct some portion of engine air flow EAF to gas-driven lift fan 106. Each of the plurality of duct inlets may be located anywhere within turbine engine 102, such as within exhaust section 140, upstream of exhaust section 140, and upstream or downstream of a portion of engine core 138. As used here, downstream means a direction from intake section 114 to exhaust section 140. Upstream means a direction from exhaust section 140 to intake section 114.

Figure 4:
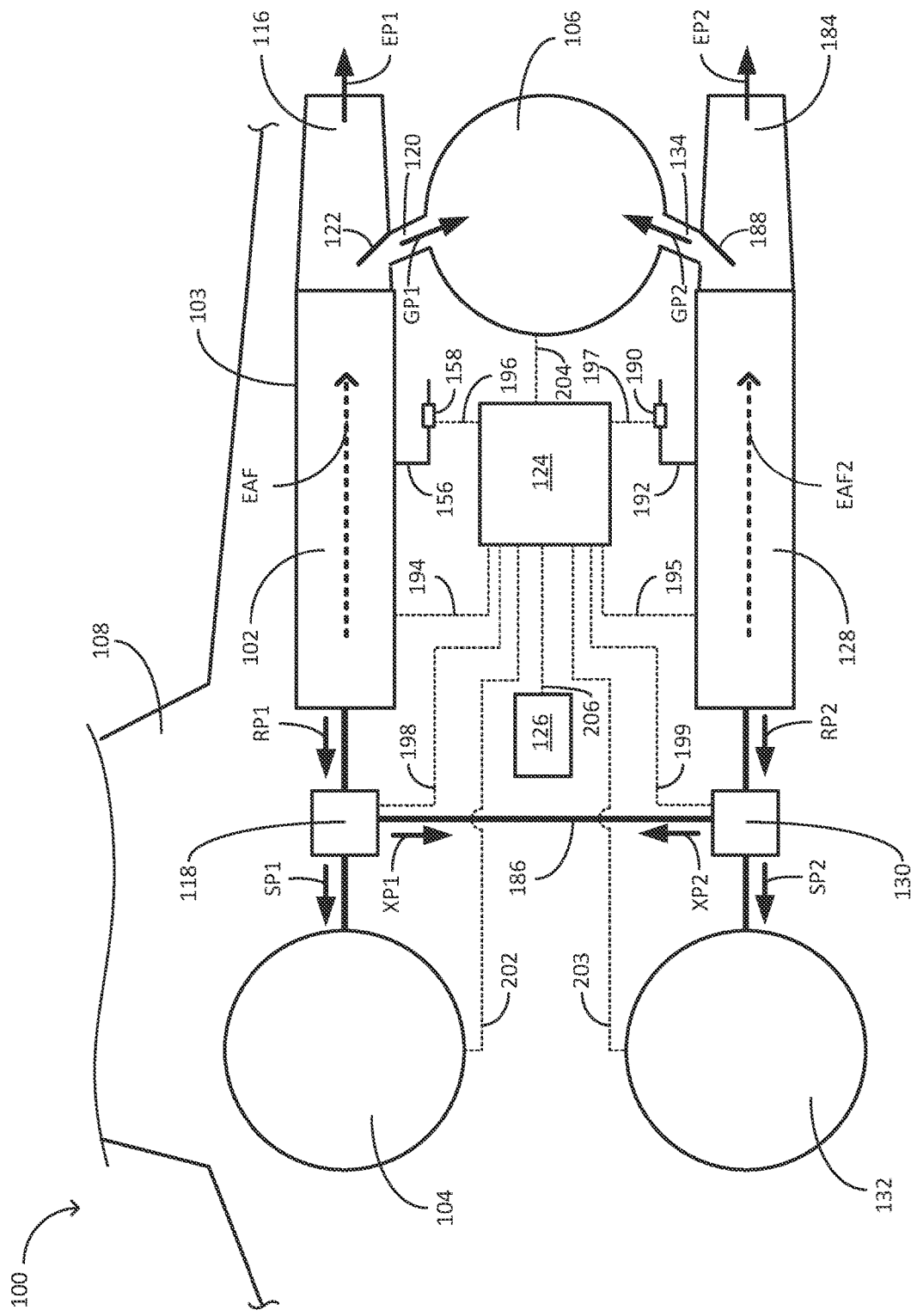
FIG. 4 is a is a schematic illustration of an example system including a plurality of turbine engines.

FIG. 4 illustrates a schematic illustration of system 100 including turbine engine 102 and second turbine engine 128. Turbine engine 102 is configured to provide rotor power to transmission system 118, provide gas flow GF to gas-driven lift fan 106 via duct 120, and provide exhaust flow EXF through jet nozzle 116. Second turbine engine 128 is configured to provide rotor power to second transmission system 130, provide a second gas flow GF2 to gas-driven lift fan 106 via second duct 134, and provide exhaust flow EXF2 through a second jet nozzle 184. System 100 may be configured such that only one or both of turbine engine 102 and second turbine engine 128 may provide power for the operation of shaft-driven lift fan 104, second shaft-driven lift fan 132, and/or gas-driven lift fan 106. In examples, system 100 includes a transfer element 186 configured to transfer power between transmission system 118 and second transmission system 130, such that turbine engine 102 and/or turbine engine 128 may provide rotor power to either or both of shaft-driven lift fan 104 or shaft-driven lift fan 132. Transfer element 186 may be, for example, a shaft or other mechanical element configured to transfer mechanical power (e.g., from a first gearbox to a second gearbox) between transmission system 118 and second transmission system 130, an electrical bus configured to transfer electrical power (e.g., from a first electrical bus to a second electrical bus) between transmission system 118 and second transmission system 130, or some other system configured to transfer power between transmission system 118 and second transmission system 130.

For example, turbine engine 102 may be configured to provide a first rotor power RP1 to transmission system 118. Transmission system 118 may be configured to transfer at least a portion of first rotor power RP1 (e.g., either as mechanical power or electrical power) as a first shaft-driven power SP1 to shaft-driven lift fan 104, such that shaft-driven lift fan 104 may use the first shaft-driven power SP1 to generate the first thrust on aircraft body 108. Turbine engine 102 may further provide power to gas-driven lift fan 106 as a first gas-driven power GP1, such that gas-driven lift fan 106 may use first gas-driven power GP1 to generate the second thrust on aircraft body 108. Turbine engine 102 may further provide a first exhaust power EP1 to jet nozzle 116 for the production of engine thrust on aircraft body 108. First gas-driven power GP1 and/or first exhaust power EP1 may be based on the flow energy (e.g., a kinetic energy, potential energy, and/or internal energy) imparted to engine air flow EAF by turbine engine 102.

Second turbine engine 128 may be configured to provide a second rotor power RP2 to second transmission system 130. Second transmission system 130 may be configured to transfer at least a portion of second rotor power RP2 (e.g., either as mechanical power or electrical power) as a second shaft-driven power SP2 to second shaft-driven lift fan 132, such that second shaft-driven lift fan 132 may use the second shaft-driven power SP2 to generate a third thrust on aircraft body 108. Second turbine engine 128 may further provide power to gas-driven lift fan 106 as a second gas-driven power GP2, such that gas-driven lift fan 106 may use second gas-driven power GP2 to generate the second thrust on aircraft body 108. Second turbine engine 128 may further provide a second exhaust power EP2 to jet nozzle 184 for the production of a second engine thrust on aircraft body 108. Second gas-driven power GP2 and/or second exhaust power EP2 may be based on the flow energy (e.g., a kinetic energy, potential energy, and/or internal energy) imparted to a second engine air flow EAF2 by second turbine engine 128.

As previously discussed, although FIG. 4 illustrates only turbine engine 102, transmission system 118, shaft-driven lift fan 104, second turbine engine 128, second transmission system 130, second shaft-driven lift fan 132, duct 120, duct 134, gas-driven lift fan 106, and transfer element 186, system 100 may include any number of number of turbine engines, transmission systems, shaft-driven lift fans, ducts, gas-driven lift fans, and transfer elements. System 100 may be configured such that any turbine engine within system 100 may provide rotor power to drive one or more shaft-driven lift fans and provide gas-driven power to drive one or more gas-driven lift fans.

Transfer element 186 may be configured to enable an exchange of power between transmission system 118 and second transmission system 130. Thus, transmission system 118 may be configured to, for example, provide a first portion of first rotor power RP1 to shaft-driven lift fan 104 as first shaft-driven power SP1 and provide a second portion of first rotor power RP1 to second transmission system 130 as a first exchange power XP1 via transfer element 186. Second transmission system 130 may be configured to use at least a portion of first exchange power XP1 to provide second shaft-driven power SP2 to second shaft-driven lift fan 132. Second transmission system 130 may be configured such that second shaft-driven power SP2 may be comprised substantially solely of first exchange power XP1, comprised of both first exchange power XP1 and second rotor power RP2, or comprised substantially solely of second rotor power RP2. Hence, system 100 may be configured may be configured such that turbine engine 102 contributes substantially all or some portion of the rotor power used by shaft-driven lift fan 104 and second shaft-driven lift fan 132 for the production of the first thrust and the third thrust on aircraft body 108.

In like manner, second transmission system 130 may be configured to, for example, provide a first portion of second rotor power RP2 to second shaft-driven lift fan 132 as second shaft-driven power SP2 and provide a second portion of second rotor power RP2 to transmission system 118 as a second exchange power XP2 via transfer element 186. Transmission system 118 may be configured to use at least a portion of second exchange power XP2 to provide first shaft-driven power SP1 to shaft-driven lift fan 104. Transmission system 118 may be configured such that first shaft-driven power SP1 may be comprised substantially solely of second exchange power XP2, comprised of both second exchange power XP2 and first rotor power RP1, or comprised substantially solely of first rotor power RP1. Hence, system 100 may be configured such that second turbine engine 128 contributes substantially all or some portion of the rotor power used by shaft-driven lift fan 104 and second shaft-driven lift fan 132 for the production of the first thrust and the third thrust on aircraft body 108.

Although illustrated as separate transmission systems in FIG. 1 and FIG. 4 for clarity, transmission system 118 and second transmission system 130 may be substantially co-located on aircraft body 108 and/or housed in a common housing. Likewise, transmission system 118 and/or second transmission system 130 may be comprised of components distributed over aircraft body 108, with one or more components of transmission system 118 and/or second transmission system 130 housed in individual housings.

System 100 may be configured such that gas-driven lift fan 106 may receive power (e.g., GP1) substantially solely from turbine engine 102, receive power (e.g., GP2) substantially solely from second turbine engine 128, or receive power (e.g., GP1 and GP2) from both turbine engine 102 and second turbine engine 128. System 100 may be configured to control the first gas power GP1 provided to gas-driven lift fan 106 (e.g., using diverter valve 122) by turbine engine 102. System 100 may be configured to control the second gas power GP2 provided to gas-driven lift fan 106 (e.g., using a second diverter valve 188) by second turbine engine 128. Hence, system 100 may be configured may be configured such that either turbine engine 102 or second turbine engine 128 contributes substantially all or some portion of the power used by gas-driven lift fan 106 for the production of the second thrust on aircraft body 108. Further, system 100 may be configured to control (e.g., using the diverter valve 122, as discussed), the first exhaust power EP1 and/or a ratio of the first exhaust power EP1 to first gas-driven power GP1 provided by turbine engine 102. System 100 may be configured to control (e.g., using the diverter valve 188 in like manner to diverter valve 122), the second exhaust power EP2 and/or a ratio of the second exhaust power EP2 to the second gas-driven power GP2 provided by second turbine engine 128.

Control circuitry 124 may be configured to monitor one or more of first rotor power RP1, first shaft-driven power SP1, first gas-driven power GP1, first exhaust power EP1, second rotor power RP2, second shaft-driven power SP2, first gas-driven power GP1, and/or first exhaust power EP1. In examples, control circuitry 124 is configured to control turbine engine 102 and/or second turbine engine 128 based on one or more of first rotor power RP1, first shaft-driven power SP1, first gas-driven power GP1, first exhaust power EP1, second rotor power RP2, second shaft-driven power SP2, first gas-driven power GP1, and/or first exhaust power EP1. In some examples, control circuitry 124 is configured to determine a total power requirement including a power required by at least two or more of first rotor power RP1, first shaft-driven power SP1, first gas-driven power GP1, first exhaust power EP1, second rotor power RP2, second shaft-driven power SP2, first gas-driven power GP1, and/or first exhaust power EP1. Control circuitry 124 may be configured to adjust an operating point of turbine engine 102 and/or second turbine engine 128 based on the total power requirement.

For example, control circuitry 124 may be configured to determine a total power requirement for a given operating point of system 100. The total power requirement may include a combined shaft-driven power including the first shaft-driven power SP1 required by shaft-driven lift fan 104 and the second shaft-driven power SP2 required by second shaft-driven lift fan 132. The total power requirement may include a combined gas-driven power including the first gas-driven power GP1 and the second gas-driven power GP2 required by gas-driven lift fan 106. The total power requirement may include a combined exhaust power including the first exhaust power EP1 and second exhaust power EP2 required from turbine engine 102 and second turbine engine 128. Control circuitry 124 may be configured to adjust the operating point of turbine engine 102 and/or turbine engine 128 such that turbine engine 102 and second turbine engine 128 respectively operate to substantially satisfy the total power requirement for the given operating point of system 100. In examples, control circuitry 124 is configured to adjust and/or control the first exchange power XP1 and/or the second exchange power XP2 exchanged between transmission system 118 and second transmission system 130 to cause turbine engine 102 and second turbine engine 128 substantially satisfy the total power requirement.

In examples, control circuitry 124 is configured to adjust an operating point of turbine engine 102 to cause turbine engine 102 to alter the first rotor power RP1, the first gas-driven power GP1, and/or the first exhaust power EP1 provided by turbine engine 102. Control circuitry 124 may be configured to adjust the operating point of turbine engine 102 to cause an increase or decrease in one or more of first rotor power RP1, the first gas-driven power GP1, and/or the first exhaust power EP1. For example, control circuitry 124 may be configured to alter the operating point of turbine engine 102 by adjusting one or more components (e.g., adjusting a position) within system 100, such as throttle 158, diverter valve 122, jet nozzle 116, shaft-driven fan outlet 170, gas-driven fan outlet 182, vanes 166, gas-driven vanes 174, tip turbine blades 172, or one or more other components. Likewise, control circuitry 124 may be configured to alter the operating point of turbine engine 102 by adjusting one or more of a second throttle 190 configured to control a flow of fuel through second fuel line 192 to second turbine engine 128, second diverter valve 188, second jet nozzle 184, a shaft-driven fan outlet of second shaft-driven lift fan 132, a plurality of vanes of second shaft-driven lift fan 132, or one or more other components. In some examples, control circuitry may be configured to alter the operation of turbine engine 102 by controlling transmission system 118 and/or transmission system 130 such that, for example, transmission system 118 and/or transmission system 130 alters the first exchange power XP1 and/or second exchange power XP2.

Control circuitry 124 may be configured to adjust an operating point of second turbine engine 128 to cause second turbine engine 128 to alter the second rotor power RP2, the second gas-driven power GP2, and/or the second exhaust power EP2 provided by second turbine engine 128. Control circuitry 124 may be configured to adjust the operating point of second turbine engine 128 to cause an increase or decrease in one or more of second rotor power RP2, the second gas-driven power GP2, and/or the second exhaust power EP2. For example, control circuitry 124 may be configured to alter the operating point of second turbine engine 128 by adjusting one or more components (e.g., adjusting a position) within system 100, such as second throttle 190, diverter valve 188, jet nozzle 184, shaft-driven fan outlet of shaft-driven lift fan 132, gas-driven fan outlet 182, a plurality of vanes of gas-driven lift fan 106, gas-driven vanes 174, tip turbine blades 172, or one or more other components. Likewise, control circuitry 124 may be configured to alter the operating point of second turbine engine 128 by adjusting one or more of a throttle 158, diverter valve 122, jet nozzle 116, shaft-driven fan outlet 170, vanes 166, or one or more other components. In some examples, control circuitry may be configured to alter the operation of second gas turbine engine 128 by controlling transmission system 118 and/or transmission system 130 such that, for example, transmission system 118 and/or transmission system 130 alters the first exchange power XP1 and/or second exchange power XP2.

Control circuitry 124 may be configured to communicate with and/or receive communications from components with system 100 to, for example, monitor the operations of components within system 100, monitor power flows throughout the system, determine and/or alter the operating points of turbine engine 102 and second turbine engine 128, direct the operation and/or positioning of one or more of the components of system 100, and/or for other reasons. For example, control circuitry 124 may be configured to communicate with turbine engine 102 and/or components therein (e.g., diverter valve 122, jet nozzle 116, intake fan 136, engine core 138, and/or other components of turbine engine 102) using, for example, communication link 194. Control circuitry 124 may be configured to communicate with second turbine engine 128 and/or components therein (e.g., diverter valve 188, jet nozzle 184, an intake fan of second turbine engine 128, an engine core of second turbine engine 128, and/or other components of second turbine engine 128) using, for example, communication link 195. Control circuitry 124 may be configured to communicate with throttle 158 and/or components within a fuel delivery for turbine engine 102 system using, for example, communication link 196. Control circuitry 124 may be configured to communicate with throttle 190 and/or components within a fuel delivery for second turbine engine 128 using, for example, communication link 197. Control circuitry 124 may be configured to communicate with transmission system 118 and/or components within transmission system 118 using, for example, communication link 198. Control circuitry 124 may be configured to communicate with second transmission system 130 and/or components within second transmission system 130 using, for example, communication link 199. Control circuitry 124 may be configured to communicate with shaft-driven lift fan 104 and/or components within shaft-driven lift fan 104 using, for example, communication link 202. Control circuitry 124 may be configured to communicate with second shaft-driven lift fan 132 and/or components within second shaft-driven lift fan 132 using, for example, communication link 203. Control circuitry 124 may be configured to communicate with gas-driven lift fan 106 and/or components within gas-driven lift fan 106 using, for example, communication link 204. Control circuitry 124 may be configured to communicate with attitude control circuitry 126 using, for example, communication link 206.

Control circuitry 124 and/or attitude control circuitry 126, as well as any other control circuitry described herein, may include any suitable arrangement of hardware, software, firmware, or any combination thereof, to perform the techniques attributed to the control circuits of this disclosure. Control circuitry 124 and/or attitude control circuitry 126 may comprise any suitable arrangement of hardware, software, firmware, or any combination thereof, to perform the techniques attributed to the control circuits of this disclosure. Control circuitry 124 and/or attitude control circuitry 126 may include any one or more microprocessors, digital signal processors (DSPs), application specific integrated circuits (ASICs), field programmable gate arrays (FPGAs), or any other equivalent integrated or discrete logic circuitry, as well as any combinations of such components. When control circuitry 124 and/or attitude control circuitry 126 includes software or firmware, control circuitry 124 and/or attitude control circuitry 126 may include any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. The control circuits or controllers may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to a control circuit or controller (e.g., may be external to a package in which the control circuit or controller is housed).

Communication links 194, 195, 196, 197, 198, 202, 203, 204, 206, as well as any other communication links described herein, may be hard-line and/or wireless communications links. In some examples, communication links 194, 195, 196, 197, 198, 202, 203, 204, 206, may comprise some portion of control circuitry 124, attitude control circuitry 126, and/or other control circuitry described herein. Communication links 194, 195, 196, 197, 198, 202, 203, 204, 206, may comprise a wired connection, a wireless Internet connection, a direct wireless connection such as wireless LAN, Bluetooth™, Wi-Fi™, and/or an infrared connection. Communication links 194, 195, 196, 197, 198, 202, 203, 204, 206, may utilize any wireless or remote communication protocol.

Figure 5:
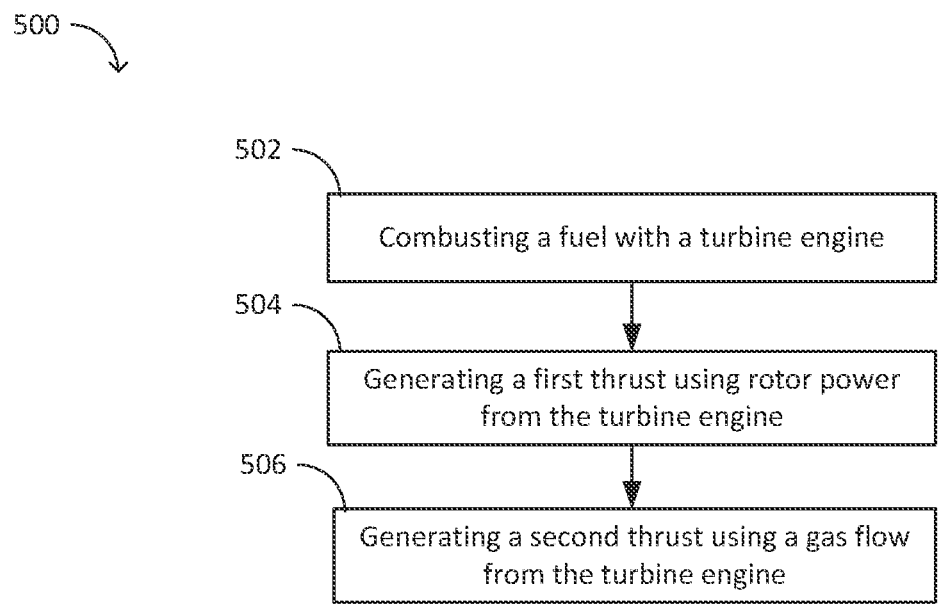
FIG. 5 is a flow diagram illustrating an example method of producing a first thrust and a second thrust on an aircraft body.

An example technique for generating a thrust on an aircraft body using a turbine engine is illustrated in FIG. 5. Although the technique is described mainly with reference to system 100 of FIGS. 1-4, the technique may be applied to other systems in other examples.

The technique includes combusting a fuel with a turbine engine 102, 128 (502). Turbine engine 102, 128 may mechanically rotate a turbine rotor 112 to generate shaft power and generate an engine air flow EAF, EAF2 through turbine engine 102, 128 using the fuel combustion. Turbine engine 102, 128 may provide an engine thrust to an aircraft body 108 using an exhaust flow EXF exhausted through a jet nozzle 116, 184. The exhaust flow EXF may be a portion of the engine air flow EAF, EAF2. Turbine engine 102, 128 may be mechanically supported by an aircraft body 108 of an aircraft 110.

In examples, turbine engine 102, 128 combusts the fuel within an engine core 138. Turbine engine 102, 128 may compress a portion of engine air flow EAF, EAF2 (e.g., a core airflow EAC) using a compressor 142 powered by the shaft power. Compressor 142 may provide compressed to a combustor 144. Combustor 144 may receive the fuel and combust the fuel using the compressed air to generate combustion gases. Turbine engine 102, 128 may generate the shaft power by causing a rotation of turbine rotor 112 when the combustion gases impinge on a plurality of turbine blades 148. Turbine engine 102, 128 may provide a portion of the shaft power to compressor 142 and an intake fan 136 configured to provide the engine air flow EAF, EAF2.

The technique includes generating a first thrust and/or third thrust on aircraft body 108 using rotor power transferred from turbine engine 102, 128 (504). The rotor power may be a portion of the shaft power generated by turbine engine 102, 128. A transmission system 118, 130 may receive the rotor power from turbine engine 102, 128 and transfer at least some portion of the rotor power to a shaft-driven lift fan 104, 132. In examples, shaft-driven lift fan 104, 132 mechanically supported by aircraft body 108 uses the rotor power to produce an air flow AF1, AF3. Shaft-driven lift fan 104, 132 may direct the air flow AF1, AF3 in a direction away from aircraft body 108 to produce the first thrust and/or third thrust on shaft-driven lift fan 104, 132. Shaft-driven lift fan 104, 132 may transfer the first thrust and/or third thrust to aircraft body 108. In examples, shaft-driven lift fan 104, 132 rotates a plurality of vanes 166 around a fan shaft 164 using the rotor power. The rotation of vanes 166 may generate the air flow AF1, AF3.

In examples, transmission system 118, 130 is configured to transfer the portion of rotor power to shaft-driven lift fan 104, 132 as mechanical power. Transmission system 118, 130 may receive the rotor power as an input torque from turbine engine 102, 128 and transfer the portion of the rotor power to shaft-driven lift fan 104, 132 as an output torque. In examples, transmission system 118, 130 is configured to transfer the portion of rotor power to shaft-driven lift fan 104, 132 as electrical power. Transmission system 118, 130 may receive the rotor power as an input torque from turbine engine 102, 128 and generate the electrical power using the input torque. Transmission system 118, 130 may transfer some portion of the generated electrical power to shaft-driven lift fan 104, 132 using one or more electrical buses and/or other electrical distribution components.

The technique includes generating a second thrust on aircraft body 108 using a gas flow GF1, GF2 (506). Gas flow GF1, GF2 may be a portion of engine air flow EAF1, EAF2. Turbine engine 102, 128 may divert some portion of engine air flow EAF1, EAF2 to cause gas flow GF1, GF2. Turbine engine 102, 128 divert the portion of engine air flow EAF1, EAF2 such that gas flow GF1, GF2 flow through duct 120, 134 and substantially bypasses jet nozzle 116, 184. In examples, turbine engine 102, 128 causes gas flow GF1, GF2 using a diverter valve 122, 188 within turbine engine 102, 128. Duct 120, 134 may provide GF1, GF2 to a gas-driven lift fan 106 mechanically supported by aircraft body 108.

Gas-driven lift fan 106 may uses gas flow GF1, GF2 an air flow AF2. Gas-driven lift fan 106 may direct the air flow AF2 in a direction away from aircraft body 108 to produce the second thrust on gas-driven lift fan 106. Gas-driven lift fan 106 may transfer the second thrust to aircraft body 108. In examples, gas-driven lift fan 106 rotates a plurality of tip turbine blades 172 using gas flow GF1, GF2. The rotation of tip turbine blades may cause a rotation of a plurality of gas-driven vanes 174 to generate the air flow AF2.

A transfer element 186 may exchange of power between transmission system 118 and second transmission system 130. In examples, turbine engine 102, 128 provides a first portion of a rotor power RP1, RP2 to a transmission system (e.g., one of transmission system 118 or second transmission system 130) as shaft-driven power SP1, SP2 and provides a second portion of rotor power RP1, RP2 to another transmission system (e.g., the other of transmission system 118 or second transmission system 130) as a first exchange power XP1 via a transfer element 186. Turbine engine 102, 128 may contribute substantially all or some portion of the rotor power used by shaft-driven lift fan 104 and second shaft-driven lift fan 132 for the production of the first thrust and the third thrust on aircraft body 108. Gas-driven lift fan 106 may receive substantially all or some portion of a power GP1, GP2 from turbine engine 102, 128 to generate the second thrust.

Control circuitry 124 may monitor one or more of rotor power RP1, RP2, shaft-driven power SP1, SP2, gas-driven power GP1, GP2, exhaust power EP1, EP2, and exchange power XP1, XP2. Control circuitry 124 may control turbine engine 102, 128 based on one or more of rotor power RP1, RP2, shaft-driven power SP1, SP2, gas-driven power GP1, GP2, exhaust power EP1, EP2, and exchange power XP1, XP2. In some examples, control circuitry 124 may determine a total power requirement including a power required by at least two or more of rotor power RP1, RP2, shaft-driven power SP1, SP2, gas-driven power GP1, GP2, exhaust power EP1, EP2, and exchange power XP1, XP2. Control circuitry 124 adjust an operating point of turbine engine 102, 128 based on the total power requirement.

The present disclosure includes the following examples.

Example 1: A system comprising: a turbine engine configured to combust a fuel to mechanically rotate a rotor to generate shaft power and generate an engine air flow through the turbine engine, wherein the turbine engine is configured to provide an engine thrust to an aircraft body using an exhaust flow, and wherein the exhaust flow is a portion of the engine air flow; a shaft-driven lift fan configured to rotate to provide a first thrust to the aircraft body using rotor power transferred from the rotor, wherein the rotor power is at least a portion of the shaft power; and a gas-driven lift fan configured to rotate to provide a second thrust to the aircraft body using a gas flow, wherein the gas flow is another portion of the engine air flow.

Example 2: The system of example 1, wherein the gas-driven lift fan includes tip turbine blades configured to generate a rotary motion when the gas flow impinges on one or more tips of the tip turbine blades, and wherein the gas-driven lift fan is configured to generate the second thrust using the rotary motion.

Example 3: The system of example 2 or example 3, wherein the turbine engine is configured to generate the engine thrust by exhausting the exhaust flow through at nozzle of the turbine engine, and further comprising a duct configured to cause the gas flow to selectively bypass the nozzle to supply the gas flow to the gas-driven lift fan.

Example 4: The system of example 3, further comprising a second turbine engine configured to generate a second engine air flow through the second turbine engine, wherein the second turbine engine is configured to provide a second engine thrust to the aircraft body by exhausting a second exhaust flow through a second nozzle, wherein the second exhaust flow is a portion of the second engine air flow, wherein the duct is configured to cause a second gas flow to selectively bypass the second nozzle to supply the second gas flow to the gas-driven lift fan, wherein the second gas flow is another portion of the second engine air flow, and wherein the gas-driven lift fan is configured to rotate to provide the second thrust using the second gas flow.

Example 5: The system of any of examples 1-4, wherein the shaft-driven lift fan includes a fan shaft and a plurality of vanes, wherein the fan shaft is configured to generate a rotary torque using the rotor power, and wherein the plurality of vanes are configured to generate the first thrust when the fan shaft transmits the rotary torque to the plurality of vanes.

Example 6: The system of example 5, further comprising a transmission system operably coupled to the rotor and the fan shaft, wherein the transmission system is configured to control the rotor power transferred from the rotor to the fan shaft.

Example 7: The system of example 6, wherein the transmission system includes a gearbox mechanically coupled to the rotor and the fan shaft, wherein the gearbox is configured to provide the rotor power to the fan shaft to cause the fan shaft to generate the rotary torque.

Example 8: The system of example 6 or example 7, wherein the transmission system includes a generator configured to generate electrical power using the rotor power, and wherein the transmission system is configured to provide the electrical power to a motor operably coupled to the fan shaft to cause the fan shaft to generate the rotary torque.

Example 9: The system of any of examples 1-8, further comprising a second turbine engine configured to mechanically rotate a second rotor to generate a second rotor power, wherein the shaft-driven lift fan is configured to rotate to provide the first thrust to the aircraft body using the second rotor power transferred from the second rotor.

Example 10: The system of any of examples 1-9, further comprising a transmission system configured to vary the rotor power provided to the shaft-driven lift fan to vary the first thrust as the turbine engine mechanically rotates the rotor.

Example 11: The system of any of examples 1-10, further comprising control circuitry configured to: determine a first power requirement required for the shaft-driven lift fan to provide the first thrust; determine a second power requirement required for the gas-driven lift fan to provide the second thrust as the shaft-driven lift fan provides the first thrust; and control an operating point of the turbine engine based on at least the first power requirement and the second power requirement.

Example 12: The system of example 11, wherein the control circuitry is configured to: determine a third power requirement required for the turbine engine to provide the engine thrust; and control the operating point of the turbine engine based on at least the first power requirement, the second power requirement, and the third power requirement.

Example 13: The system of any of examples 1-12, further comprising: an attitude control system configured to monitor an attitude of the aircraft body; and control circuitry configured to cause the shaft-driven lift fan to provide an amount of the first thrust and cause the gas-driven lift fan to provide an amount of the second thrust based at least in part on a signal indicative of the attitude from the attitude control system.

Example 14: The system of any of examples 1-13, wherein at least one of the shaft-driven lift fan is configured to vary a direction of the first thrust relative to the aircraft body or the gas-driven lift fan is configured to vary a direction of the second thrust relative to the aircraft body.

Example 15: The system of any of examples 1-14, wherein the shaft-driven lift fan is configured to provide the first thrust in a first direction substantially perpendicular to a longitudinal axis of the aircraft body, wherein the gas-driven lift fan is configured to provide the second thrust in a second direction substantially perpendicular to the longitudinal axis of the aircraft body, and wherein the turbine engine is configured to provide the engine thrust in a direction substantially parallel to the longitudinal axis of the aircraft body.

Example 16: A system comprising: a first turbine engine configured to combust a first fuel to mechanically rotate a first rotor to generate a first shaft power and generate a first engine air flow through the first turbine engine, wherein the first turbine engine is configured to provide a first engine thrust to an aircraft body using a first exhaust flow, and wherein the first exhaust flow is a portion of the first engine air flow; a second turbine engine configured to combust a second fuel to mechanically rotate a second rotor to generate a second shaft power and generate a second engine air flow through the second turbine engine, wherein the second turbine engine is configured to provide a second engine thrust to the aircraft body using a second exhaust flow, and wherein the second exhaust flow is a portion of the second engine air flow; a shaft-driven lift fan configured to rotate to provide a first thrust to the aircraft body using at least one of a first rotor power transferred from the first rotor or a second rotor power transferred from the second rotor, wherein the first rotor power is a portion of the first shaft power and the second rotor power is a portion of the second shaft power; and a gas-driven lift fan configured to rotate to provide a second thrust to the aircraft body using at least one of a first gas flow or a second gas flow, wherein the first gas flow is another portion of the first engine air flow and the second gas flow is another portion of the second engine air flow.

Example 17: The system of example 16, wherein the first turbine is configured to generate the first engine thrust by exhausting the first exhaust flow through a first nozzle of the first turbine engine, and wherein the second turbine is configured to generate the second engine thrust by exhausting the second exhaust flow through a second nozzle of the second turbine engine, and further comprising: a duct configured to cause the first gas flow to selectively bypass the first nozzle and cause the second gas flow to selectively bypass the second nozzle to supply at least one of the first gas flow or the second gas flow to the gas-driven lift fan.

Example 18: The system of example 16 or example 17, wherein: the shaft-driven fan includes a fan shaft and a plurality of blades, wherein the fan shaft is configured to generate a rotary torque using at least one of the first rotor power or the second rotor power, and wherein the fan blades are configured to generate the first thrust when the fan shaft transmits the rotary torque to the plurality of fan blades; and the gas-driven lift fan includes tip turbine blades configured to generate a rotary motion when at least one of the first gas flow or the second gas flow impinges on one or more tips of the tip turbine blades, wherein the gas-driven lift fan is configured to generate the second thrust using the rotary motion.

Example 19: A method comprising: combusting a fuel with a turbine engine to mechanically rotate a rotor to generate shaft power and generate an engine air flow through the turbine engine, wherein the turbine engine is configured to provide an engine thrust to an aircraft body using an exhaust flow, and wherein the exhaust flow is a portion of the engine air flow; generating a first thrust on the aircraft body using a shaft-driven lift fan configured to rotate using rotor power transferred from the rotor, wherein the rotor power is at least a portion of the shaft power; and generating a second thrust on the aircraft body using a gas-driven lift fan configured to rotate using a gas flow, wherein the gas flow is another portion of the engine air flow.

Example 20: The method of example 19, further comprising: determining, using control circuitry, a first power requirement required for the shaft-driven lift fan to provide the first thrust; determining, using the control circuitry, a second power requirement required for the gas-driven lift fan to provide the second thrust as the mechanically driven fan provides the first thrust; and controlling, using the control circuitry, an operating point of the turbine engine based on at least the first power requirement and the second power requirement.

Various examples have been described. These and other examples are within the scope of the following claims.

What is claimed is:

1. A system comprising:
a turbine engine configured to combust a fuel to mechanically rotate a rotor to generate shaft power and generate an engine air flow through the turbine engine using a first portion of the shaft power, wherein the turbine engine is configured to provide a forward thrust to an aircraft body by exhausting an exhaust flow through a nozzle of the turbine engine, and wherein the exhaust flow is a portion of the engine air flow;
a second turbine engine configured to generate a second engine air flow through the second turbine engine, wherein the second turbine engine is configured to provide a second forward thrust to the aircraft body by exhausting a second exhaust flow through a second nozzle, wherein the second exhaust flow is a portion of the second engine air flow;

a shaft-driven lift fan configured to rotate to provide a first vertical thrust to the aircraft body using rotor power transferred from the rotor, wherein the rotor power is a second portion of the shaft power;

a gas-driven lift fan configured to rotate to provide a second vertical thrust to the aircraft body using a gas flow, wherein the gas flow is at least one of another portion of the engine air flow or another portion of the second engine air flow; and a duct configured to cause the gas flow to selectively bypass at least one of the nozzle or the second nozzle to supply the gas flow to the gas-driven lift fan.

2. The system of claim 1, wherein the gas-driven lift fan includes tip turbine blades configured to generate a rotary motion when the gas flow impinges on one or more tips of the tip turbine blades, and wherein the gas-driven lift fan is configured to generate the second vertical thrust using the rotary motion.

3. The system of claim 1, wherein the shaft-driven lift fan includes a fan shaft and a plurality of vanes, wherein the fan shaft is configured to generate a rotary torque using the rotor power, and wherein the plurality of vanes are configured to generate the first vertical thrust when the fan shaft transmits the rotary torque to the plurality of vanes.

4. The system of claim 3, further comprising a transmission system operably coupled to the rotor and the fan shaft, wherein the transmission system is configured to control the rotor power transferred from the rotor to the fan shaft.

5. The system of claim 4, wherein the transmission system includes a gearbox mechanically coupled to the rotor and the fan shaft, wherein the gearbox is configured to provide the rotor power to the fan shaft to cause the fan shaft to generate the rotary torque.

6. The system of claim 4, wherein the transmission system includes a generator configured to generate electrical power using the rotor power, and wherein the transmission system is configured to provide the electrical power to a motor operably coupled to the fan shaft to cause the fan shaft to generate the rotary torque.

7. The system of claim 1, wherein the second turbine engine is configured to mechanically rotate a second rotor to generate a second shaft power, and wherein the shaft-driven lift fan is configured to rotate to provide the first vertical thrust to the aircraft body using the shaft power and the second shaft power.

8. The system of claim 7, further comprising a control system configured to adjust one or more components of the system to cause the turbine engine and the second turbine engine to provide at least one of the first shaft power or the second shaft power to generate at least one of a flow energy of the another portion of the engine air flow or a flow energy of the another portion of the second engine air flow sufficient to provide the second vertical thrust as the shaft-driven lift fan rotates to provide the first vertical thrust using the shaft power and the second shaft power.

9. The system of claim 1, further comprising control circuitry configured to:

determine a first power requirement required for the shaft-driven lift fan to provide the first vertical thrust;

determine a second power requirement required for the gas-driven lift fan to provide the second vertical thrust as the shaft-driven lift fan provides the first vertical thrust; and adjust one or more components of the system to cause the turbine engine to generate a shaft power sufficient to provide the first power requirement and the second power requirement.

10. The system of claim 9, wherein the control circuitry is configured to:

determine a third power requirement required for the turbine engine to provide the forward thrust; and control the operating point of the turbine engine based on at least the first power requirement, the second power requirement, and the third power requirement.

11. The system of claim 1, further comprising:

an attitude control system configured to monitor an attitude of the aircraft body; and control circuitry configured to cause the shaft-driven lift fan to provide an amount of the first vertical thrust and cause the gas-driven lift fan to provide an amount of the second vertical thrust based at least in part on a signal indicative of the attitude from the attitude control system.

12. The system of claim 1, wherein at least one of the shaft-driven lift fan is configured to vary a direction of the first vertical thrust relative to the aircraft body or the gas-driven lift fan is configured to vary a direction of the second vertical thrust relative to the aircraft body.

13. The system of claim 1, further comprising a control system configured to adjust one or more components of the system to cause the turbine engine to:

provide the first portion of the shaft power to generate a flow energy of the gas flow sufficient to provide the second vertical thrust, and provide the second portion of the shaft power sufficient to generate the first vertical thrust as the turbine engine provides the first portion of the shaft power sufficient to provide the second vertical thrust.

14. The system of claim 13, wherein the first portion of the shaft power generates a flow energy of the engine air flow, and wherein the flow energy of the gas flow is a portion of a flow energy of the engine air flow.

15. An aircraft comprising:

a turbine engine configured to combust a first fuel to mechanically rotate a rotor to generate shaft power and generate an engine air flow through the turbine engine using a portion of the shaft power, wherein the turbine engine is configured to provide a forward thrust to an aircraft body of the aircraft using a first exhaust flow, and wherein the first exhaust flow is a portion of the engine air flow;

two or more shaft-driven lift fans, a shaft-driven lift fan of the two or more shaft-driven lift fans configured to rotate to provide a first vertical thrust to the aircraft body using rotor power transferred from the rotor, wherein the rotor power is a second portion of the shaft power;

a single gas-driven lift fan configured to rotate to provide a second vertical thrust to the aircraft body using a gas flow, wherein the gas flow is another portion of the engine air flow, wherein the two or more shaft-driven lift fans are forward of the single gas-driven lift fan.

16. The system of claim 15, wherein the turbine is configured to generate the forward thrust by exhausting the exhaust flow through a nozzle of the turbine engine, and further comprising:

a duct configured to cause the gas flow to selectively bypass the nozzle to supply the gas flow to the single gas-driven lift fan.

17. The system of claim 15, wherein at least one of the single shaft-driven lift fan is configured to vary a direction of the first vertical thrust relative to the aircraft body or the gas-driven lift fan is configured to vary a direction of the second vertical thrust relative to the aircraft body.

18. A method comprising:

combusting a fuel with a turbine engine to mechanically rotate a rotor to generate a shaft power and generate an engine air flow through the turbine engine using a first portion of the shaft power, wherein the turbine engine is configured to provide a forward thrust to an aircraft body by exhausting an exhaust flow through a nozzle of the turbine engine, and wherein the exhaust flow is a portion of the engine air flow;

rotating a second rotor using a second turbine engine to generate a second shaft power and generate a second engine air flow through the second turbine engine, wherein the second turbine engine is configured to provide a second forward thrust to the aircraft body by exhausting an second exhaust flow through a second nozzle, and wherein the second exhaust flow is a portion of the second engine air flow;

generating a first vertical thrust on the aircraft body using a shaft-driven lift fan configured to rotate using rotor power transferred from the rotor, wherein the rotor power is a second portion of the shaft power;

supplying a gas flow, using a duct configured to selectively bypass at least one of the nozzle or the second nozzle, to a gas-driven lift fan, wherein the gas flow is another portion of the engine air flow or another portion of the second engine air flow; and generating a second vertical thrust on the aircraft body using the gas-driven lift fan, wherein the gas-driven lift fan is configured to rotate using the gas flow.

19. The system of claim 15, wherein a second shaft-driven lift fan of the two or more shaft-driven lift fans is configured to rotate to provide a third vertical thrust to the aircraft body using the rotor power transferred from the rotor.

20. The method of claim 18, further comprising:

determining, using control circuitry, a first power requirement required for the shaft-driven lift fan to provide the first vertical thrust;

determining, using the control circuitry, a second power requirement required for the gas-driven lift fan to provide the second vertical thrust as the shaft-driven lift fan provides the first thrust; and controlling, using the control circuitry, an operating point of the turbine engine based on at least the first power requirement and the second power requirement.

* * * * *